Oct. 3, 1961 R. A. SHAFFER ET AL 3,002,847

PROCESS FOR PRODUCING A FINE MESH PATTERN ON A SUBSTRATE

Filed Sept. 11, 1958

INVENTORS.
ROBERT A. SHAFFER
CURTIS C. ATTRIDGE
BY
AND
ATTORNEYS 3,002,847
Patented Oct. 3, 1961

3,002,847

PROCESS FOR PRODUCING A FINE MESH PATTERN ON A SUBSTRATE

Robert A. Shaffer, Elmira, and Curtis C. Attridge, Horseheads, N.Y., assignors, by mesne assignments, to the United States of America as represented by the Secretary of the Air Force Filed Sept. 11, 1958, Ser. No. 760,524
5 Claims. (Cl. 117—5.5)

This invention is a process for producing a fine mesh pattern image on a substrate. A substrate underlies or supports something.

As a background for imparting a clear understanding of the present invention as claimed, mosaics may be made by placing a mask on a mask supporting substrate, applying a material in finely divided, powdered or vapor phase to the substrate through apertures in the mask, securing the material to the substrate and removing the mask to thereby leave the mask negative pattern secured to the substrate. Issued patents disclosing representative practices are 2,455,513, issued December 7, 1948, to James D. McGee; 2,189,340, issued February 6, 1940, to John S. Donal; 2,507,958, issued May 16, 1950, to Harry Cassman, and 2,256,341, issued September 16, 1941, to Willard Hickok.

A brief summary of the invention follows, indicating its nature and substance together with a statement of the object of the invention commensurate and consistent with the invention as claimed and also setting out the exact nature, the operation and the essence of the invention complete with proportions and techniques that are necessary with its use. The purpose of the invention also is stipulated. The presentation is adequate for any person who is skilled in the art and science to which the invention pertains to use it without involving extensive experimentation. The best mode of carrying out the invention is presented by the citing of a specific operative example inclusive of the preparation and the use of at least one example of the invention.

This invention produces a positive reproduction of a fine mesh pattern of a mask that has an arrangement of holes in a predetermined configuration on a substrate by a single evaporation process. A magnetically responsive mesh mask is applied to one side of a substrate and is held in place by a magnet positioned on the other side of the substrate. A magnetically responsive powder is inserted into the interstices of the mesh mask and is held in place on the substrate as the mesh mask is lifted in a normal direction away from the substrate against the pull of the magnet, leaving a negative powder image of the mesh mask on the substrate. The substrate, with the negative powder image held securely in place by the energized magnet, is placed in a furnace, the furnace is evacuated, then a vapor is directed to the image side of the substrate where it solidifies adhered to the image side of the substrate and overlying the negative image of the mesh mask. The substrate is removed from the furnace and the magnet is deenergized or is removed from the substrate, thereby releasing the magnetically responsive powder from its influence. The powder may then be removed from the image face of the substrate freely if the solidified vapor permits or by a required magnetic force directing its pull away from the substrate with the magnet adjacent to the image face.

Figure 1:
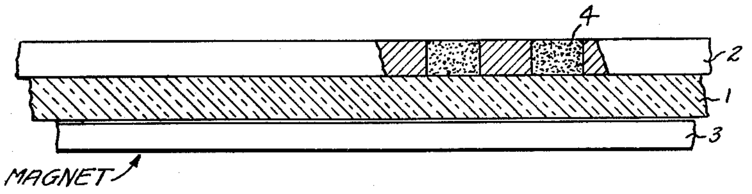
FIG. 1 is an elevational view, partly broken away and in section, representing a mesh mask with powder in its interstices on one side of a substrate and a magnet on the other side of the substrate.
Figure 2:
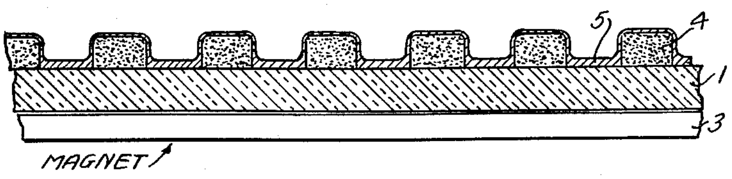
FIG. 2 is a sectional view of the substrate bearing on one side a powder negative pattern on which a vapor has solidified and with a magnet on the other side of the substrate.
Figure 3:
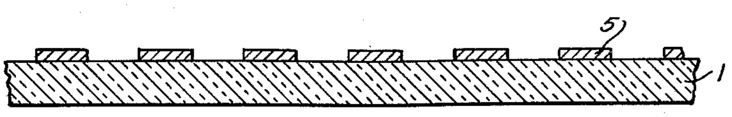
FIG. 3 is a sectional view of the substrate bearing a replica of the mesh mask bonded to the substrate by having solidified thereon from the vapor phase.

The process, involving in part the equipment represented in the accompanying drawing, accomplishes a positive image of a mesh mask applied in bonded state to a substrate.

In initiating the process, a substrate 1 has applied thereto a mesh mask 2 under laboratory conditions of temperature and pressure. The mesh mask 2 is attracted by a magnetic field as by containing iron or the like. The magnetic field is supplied by a suitable magnet 3 positioned on the side of the substrate remote from the mesh mask 2.

A powder 4 which is responsive to a magnetic field is then dusted into the interstices of the mesh mask 2 in sufficient quantity to cover to a uniform depth the surfaces of the substrate which are exposed through the interstices or holes of the mesh mask.

The mesh mask 2 is then lifted in a direction normal to the surface of the substrate 1 away from the substrate in a manner to avoid lateral displacements of the interstices contoured pattern of the areas of powder 4 retained in position by the field of the magnet 3.

The substrate 1, the magnet 3 and the negative image of the mesh mask 2 defined by the mesh mask interstices pattern of the powder 4, are then positioned within a compartment such as a furnace and the furnace is evacuated.

A material out of which the positive image of the mesh mask 2 pattern is to be bonded to the side of the substrate 1 bearing the negative pattern in powdered form, is then applied preferably in the vapor state or the like, to the substrate 1 where it solidifies as a thin surface covering 5 of substantially uniform thickness.

The process adapts itself well to the deposition of successive layers of coating materials by repetitions of the process using successive masks of supplementing aperture contours and conformations in the development of three dimensional designs, color effects, optical phenomena and the like. The fineness of the powdered material is to conform with the delicacy and the smallness of the apertures in the mask. The depth of the powdered material preferably is minimized for optimum delicacy and precision in the mask positive image reproduction on the substrate.

The deenergization of the magnet 3 or its removal from its proximity to the substrate releases the powder 4 from the field of the magnet. The release of the powder 4 from the field of the magnet 3 may permit its removal from the surface of the substrate 1 directly. In the event the thin surface covering overlying the powder 4 on the pattern surface of the substrate 1 is of a thickness to prevent the easy removal of the powder 4, the magnet 3 may be positioned adjacent the pattern surface of the substrate 1 and the magnet energization may be increased until the magnetic field draws the magnetic powder through the surface covering on top of the powder.

Common magnetic substances contain iron, nickel, cobalt, manganese, chromium and cerium. Magnetic fields are maintained by permanent magnets, electromagnets, solenoids and the like capable of maintaining a magnetic flux. The substrate 1 illustratively may be made of glass, mica, a plastic, paper, etc. The powder 4 may be iron, nickel, etc. The vaporized material may be a metal such as silver, cerium, strontium, barium, antimony, etc. Handbooks provide physical data on the materials disclosed herein.

It will be apparent that modifications may be made in the steps of the process and in the agencies which are employed therein as disclosed herein without departing from the scope of the invention defined in the appended claims.

I claim:

1. The process of applying a positive image of a mesh mask containing an element selected from the magnetically attracted group of iron, nickel, cobalt, manganese, chromium and cerium having interstices to a substrate which is accomplished by contacting a first side of the substrate with the mesh mask which is attracted by a magnetic field, applying a magnetic field to the mesh mask as a means for maintaining the mesh mask against the first side of the substrate, applying a powder selected from the group of iron and nickel attracted by a magnetic field through the interstices in the mesh mask to the first side of the substrate selected from the group of glass, mica, plastic and paper, and in a pattern determined by the interstices in the magnetically attracted mesh mask, removing the mesh mask from the first side of the substrate by lifting the mesh mask in a normal direction from the powder bearing side of the substrate along with a minimum of powder particles that are attracted thereby with a minimum of distortion of the powder aperture defined pattern retained on the surface of the substrate by the attraction of the magnetic field, causing a vaporized material to adhere to the first side of the substrate and to continuously overlie the powder pattern retained thereon by the attraction of the magnetic field, and reversing the polarity of the magnetic field in applying a repulsion force capable of removing the powder from the first side of the substrate leaving the adhered material bonded to the substrate in a pattern which is a positive image of the mesh mask.

2. The process defined in the above claim 1 wherein the mesh mask contains iron, and the powder is powdered iron.

3. The process defined in the above claim 1 wherein the vaporized material is silver.

4. The process defined in the above claim 1 wherein the vaporized material is copper.

5. The process of bonding an image of a magnetically responsive mesh mask having interstices to a glass surface by placing a magnet beneath the glass, placing the mesh mask on the glass surface and within the field of the magnet, applying a magnetically responsive powder to the glass surface through the interstices in the mesh mask with the powder within the field of the magnet, lifting the mesh mask from the glass surface with a minimum of powder particles attracted thereby and leaving the powder image of the mesh mask interstices on the glass surface in a substantially intact pattern determined by the interstices of the mesh mask, applying a coating material to the glass surface and the mesh mask interstices powder image as a thin continuous coating of material bonded to the glass surface, and removing the powder from the glass surface and removing the thin coating of material overlying the powder away from mesh mask image of the thin coating of material bonded to the glass surface.

References Cited in the file of this patent

UNITED STATES PATENTS

| | | |
|---|---|---|
| 2,139,640 | Mall et al. | Dec. 6, 1938 |
| 2,256,341 | Hickok | Sept. 15, 1941 |
| 2,455,513 | McGee | Dec. 7, 1948 |
| 2,507,958 | Cassman | May 16, 1950 |
| 2,840,039 | Darnell et al. | June 29, 1958 |
| 2,916,396 | Perronod | Dec. 8, 1959 |